(12) United States Patent
Testa et al.

(10) Patent No.: US 9,971,011 B2
(45) Date of Patent: May 15, 2018

(54) APPARATUS AND METHOD FOR PROCESSING ELECTRONIC INTELLIGENCE (ELINT) AND RADAR TRACKING DATA

(71) Applicant: Raytheon Company, Waltham, MA (US)

(72) Inventors: Loretta A. Testa, Stanton, CA (US); Samuel S. Blackman, Los Angeles, CA (US); Ray B. Huffaker, Redondo Beach, CA (US); Catherine Durand, Playa Del Rey, CA (US); Kristine Hacobian, Somis, CA (US)

(73) Assignee: Raytheon Company, Waltham, MA (US)

( * ) Notice: Subject to any disclaimer, the term of this patent is extended or adjusted under 35 U.S.C. 154(b) by 270 days.

(21) Appl. No.: 14/684,616

(22) Filed: Apr. 13, 2015

(65) Prior Publication Data

US 2016/0299223 A1    Oct. 13, 2016

(51) Int. Cl.
*G01S 13/72* (2006.01)
*G01S 3/02* (2006.01)
*G01S 13/86* (2006.01)
*G01S 3/78* (2006.01)

(52) U.S. Cl.
CPC ............... *G01S 3/02* (2013.01); *G01S 13/72* (2013.01); *G01S 13/86* (2013.01); *G01S 3/78* (2013.01)

(58) Field of Classification Search
CPC .................................. G01S 3/02; G01S 13/72
USPC ...................................................... 342/90–95
See application file for complete search history.

(56) References Cited

U.S. PATENT DOCUMENTS

| | | | | |
|---|---|---|---|---|
| 5,414,643 | A | * | 5/1995 | Blackman ............. G01S 13/726 342/95 |
| 5,909,189 | A | | 6/1999 | Blackman et al. |
| 6,278,401 | B1 | * | 8/2001 | Wigren .................. G01S 3/325 342/108 |

(Continued)

FOREIGN PATENT DOCUMENTS

WO        98/58274       12/1998

OTHER PUBLICATIONS

Search Report and Written Opinion dated Mar. 9, 2016, in corresponding PCT Application No. PCT/US2015/064408, filed on Dec. 8, 2015.

(Continued)

*Primary Examiner* — Marcus E Windrich
(74) *Attorney, Agent, or Firm* — Burns & Levinson, LLP; Joseph M. Maraia

(57) ABSTRACT

A system and method for tracking an object receive electronic intelligence (ELINT) track information related to the object and radar track information. A first likelihood that the radar track information is also related to the object is determined at a first time of the ELINT track information and a first time of the radar track information. A second likelihood that the radar track information is also related to the object is determined at a second time of the ELINT track information and a second time of the radar track information. The first likelihood and the second likelihood are processed to determine whether the ELINT track information and the radar track information should be associated as both being related to the object.

12 Claims, 2 Drawing Sheets

(56) References Cited

U.S. PATENT DOCUMENTS

| | | | | |
|---|---|---|---|---|
| 7,626,535 | B2* | 12/2009 | Ding | G01S 13/726 342/90 |
| 8,437,972 | B2* | 5/2013 | Ploplys | G06N 99/005 702/104 |
| 8,515,881 | B2 | 8/2013 | Schwoegler et al. | |
| 8,654,005 | B2* | 2/2014 | Christopher | G01S 13/72 342/137 |
| 8,799,189 | B2 | 8/2014 | Schwoegler et al. | |
| 2005/0001759 | A1* | 1/2005 | Khosla | G01S 13/726 342/90 |
| 2005/0033789 | A1* | 2/2005 | Sirois | G01S 7/021 708/422 |
| 2006/0208945 | A1* | 9/2006 | Kolanek | H01Q 3/2605 342/377 |
| 2008/0255911 | A1* | 10/2008 | Khosla | G01S 5/0294 705/7.38 |
| 2012/0005149 | A1 | 1/2012 | Chen et al. | |
| 2013/0275034 | A1* | 10/2013 | Cronin | G01C 23/00 701/300 |
| 2013/0325787 | A1* | 12/2013 | Gerken | G06N 7/005 706/52 |

OTHER PUBLICATIONS

"Variable Structure Interacting Multiple Model Filter (VS-IMM) for Tracking Targets with Transportation Network Constraints," Proc. SPIE, vol. 4048 (2000), pp. 247-257.
S. Blackman and R. Popoli, *Design and Analysis of Modern Tracking Systems*, Artech House (1999), Sec. 8.6.1.

* cited by examiner

APPARATUS AND METHOD FOR PROCESSING ELECTRONIC INTELLIGENCE (ELINT) AND RADAR TRACKING DATA

BACKGROUND

1. Technical Field

This application relates to processing of object tracking data and, more particularly, to fusing and processing multiple types of tracking data, such as electronic intelligence (ELINT) and radar tracking data, for an object being tracked.

2. Discussion of Related Art

Objects can be detected remotely by various forms of detection technology. For example, electronic intelligence (ELINT) technology can include one or more types of passive sensors which can be used to detect emissions from a variety of electronic objects, such as cellular telephones or other devices. By gathering ELINT data from a source or emitter over time, an ELINT track of the emitter can be developed. Some objects or targets may have multiple emitters of ELINT information. As a result, multiple ELINT tracks can be developed for a single target.

Radar technology can also be used to detect range, bearing and/or motion (velocity and/or direction of motion) of an object. Over time, radar tracks for objects can also be obtained.

As noted above, multiple ELINT tracks can be associated with the same object or target. Also, it is common that ELINT tracks will provide bearing or direction information, but no range or motion information. Thus, by itself, ELINT track information is often ambiguous with regard to the object being tracked. In contrast, radar systems can typically provide range, bearing and motion information for remote objects. However, certain desirable information in ELINT tracks, such as, for example, the identity of the object, cannot by obtained from radar track information.

SUMMARY

According to one aspect, a method of tracking an object is provided. According to the method, electronic intelligence (ELINT) track information related to the object is received. Radar track information is also received. A first likelihood that the radar track information is also related to the object is determined at a first time of the ELINT track information and a first time of the radar track information. A second likelihood that the radar track information is also related to the object is determined at a second time of the ELINT track information and a second time of the radar track information. The first likelihood and the second likelihood are processed to determine whether the ELINT track information and the radar track information should be associated as both being related to the object.

According to some exemplary embodiments, the method further comprises combining the ELINT track information and the radar track information to generate combined ELINT and radar track information related to the object, if it is determined that the ELINT track information and the radar track information should be associated as both being related to the object.

According to some exemplary embodiments, the method further comprises applying a coarse gate to determine whether the ELINT track information and the radar track information include position information indicating positions within a predetermined threshold maximum distance.

According to some exemplary embodiments, processing the first and second likelihoods comprises applying Dempster-Shafer analysis to the ELINT track information and the radar track information.

According to some exemplary embodiments, processing the first and second likelihoods comprises analyzing the radar track information to determine whether a target of the radar track information has stopped moving or has slowed.

According to some exemplary embodiments, the ELINT track information includes track information related to multiple emitters on the object.

According to another aspect, an apparatus for tracking an object is provided. The apparatus includes an electronic intelligence (ELINT) interface for receiving ELINT track information related to the object and a radar interface for receiving radar track information. A processor determines a first likelihood that the radar track information is also related to the object at a first time of the ELINT track information and a first time of the radar track information. The processor also determines a second likelihood that the radar track information is also related to the object at a second time of the ELINT track information and a second time of the radar track information. The processor processes the first likelihood and the second likelihood to determine whether the ELINT track information and the radar track information should be associated as both being related to the object.

According to some exemplary embodiments, the processor combines the ELINT track information and the radar track information to generate combined ELINT and radar track information related to the object, if it is determined that the ELINT track information and the radar track information should be associated as both being related to the object.

According to some exemplary embodiments, the processor applies a coarse gate to determine whether the ELINT track information and the radar track information include position information indicating positions within a predetermined threshold maximum distance.

According to some exemplary embodiments, the processor applies Dempster-Shafer analysis to the ELINT track information and the radar track information to process the first and second likelihoods.

According to some exemplary embodiments, the processor analyzes the radar track information to determine whether a target of the radar track information has stopped moving or has slowed, to process the first and second likelihoods.

According to some exemplary embodiments, the ELINT track information includes track information related to multiple emitters on the object.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
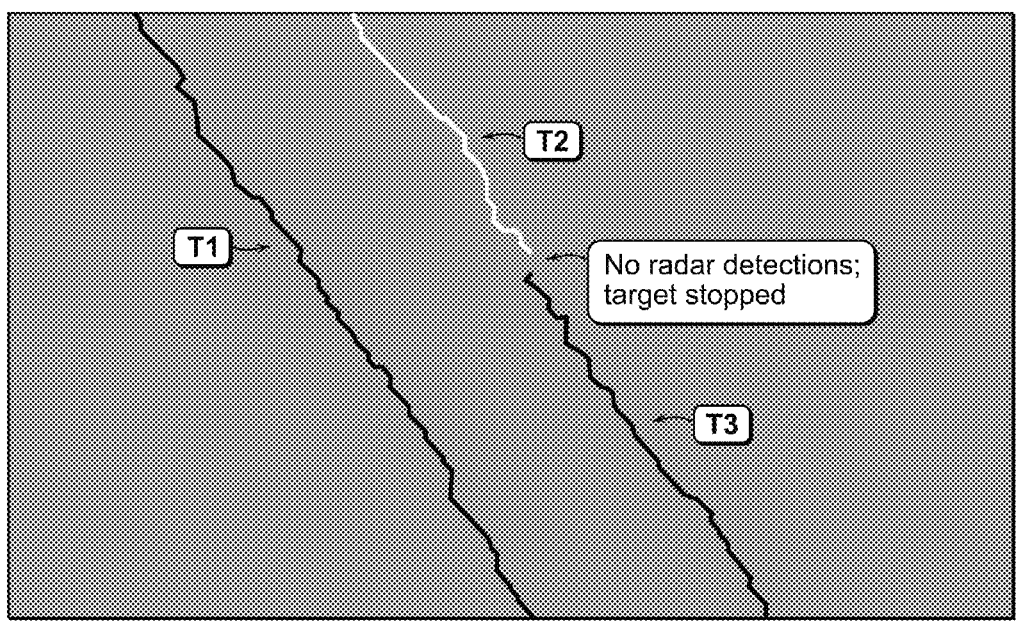
FIG. 1 includes a schematic diagram which illustrates the scenario with two boats on parallel courses; the invention described herein identifies the two tracks on targets T2 and T3 as the same target having stopped and then resumed its course.

This disclosure is directed to a system and method for association and fusion of multiple types of track data, such as ELINT and radar track data, to unambiguously track an object or target. The approach described in detail herein is applicable to the systems, devices and methods disclosed in multiple hypothesis tracking (MHT) described in U.S. Patent Application Publication No. US 2012/0233097 and U.S. Patent Application Publication No. US 2012/0233098, both entitled, "Multiple Hypothesis Tracking." The approach described herein in detail is also applicable to the systems, devices and methods disclosed in U.S. Patent Application Publication No. US 2013/0275034, entitled, "Locally Invariant Global Hypotheses Tracking. All of the three U.S. Patent Application Publications listed above are incorporated herein by reference in their entirety.

The approach to ELINT/radar data association and fusion of the disclosure will now be described in detail. It should be understood that the present disclosure describes association or fusion of ELINT and radar data types as an exemplary illustrative embodiment only. The present disclosure is applicable to any combination of sensor data, and not just ELINT and radar data. According to the disclosure, electronic intelligence (ELINT) track information, or any angle/bearing-only track information related to the object, is received. Radar track, or any three-dimensional positional and motion track information is also received. That is, according to the disclosure, ambiguous angle-only or bearing-only track information related to the object is received. Three-dimensional positional and motion track information is also received. For example, as described herein, ELINT track data will be considered as the angle-only track data source, and radar track data will be considered as the full-position and motion-track data source.

It is assumed that the ELINT system/tracker periodically reports track data that includes metric and feature data. The metric data can either be angle/bearing-only or a three-dimensional (3-D) position with the associated error statistics (angle error sigma or 3-D covariance). In the case of angle-only data, or if the three-dimensional position is reported in local level coordinates, the sensor position must also be reported. However, there may be targets that are seen only by ELINT and others that are only seen by radar. Also, there may be more than one ELINT emitter from a single target, so multiple ELINT tracks may be associated with a single radar track. When a target slows down or stops, its radar track may be lost, but it will still be desired to maintain the ELINT-to-radar association.

This can be considered a version of the classical track-to-track (T2T) association/fusion problem, but several extensions must be made. First, more accurate association can be obtained if history is used. Standard T2T logic typically compares just the current track state estimates, but the approach of the disclosure described herein, which employs Dempster-Shafer (D-S) reasoning, effectively accumulates probability over time, taking into account the time histories of the tracks. Second, logic is utilized to recognize when a target has potentially stopped, in which case the target will no longer be detected and the radar track deleted. This logic will enable a temporary pseudo track to be created in lieu of a radar track, allowing the association with the ELINT track to be maintained without updates from a radar track. This will also allow stitching of the old and new radar tracks if the target begins moving again and is once again detected and tracked by the radar. Also, the one-to-one track association restriction of standard T2T logic is expanded to allow multiple ELINT tracks to associate with a single radar track.

According to the exemplary embodiments, as ELINT tracks are input they are placed in an ELINT track file. Each time an ELINT track is reported, it is tested with all existing reportable (universal) tracks that were formed on radar data. A Gaussian density (likelihood) function is used to compute the likelihood that an ELINT track represents the same target as a radar track. Gating tests are used to eliminate very unlikely pairings prior to computing likelihoods, but, essentially, an ELINT track is tested with all radar tracks, and likelihoods of their associations are computed. A predefined likelihood is also used to represent the possibility that there is no radar track for a given ELINT track. These likelihoods are converted to (D-S) mass values so that each ELINT track has a D-S mass vector with the masses associated with the assignment of this ELINT track to various radar tracks. These computations are done separately for each ELINT track so that more than one ELINT track can be assigned to the same radar track.

Each time a new set of ELINT track data is reported, the track-to-track likelihoods are recomputed and converted to D-S masses as described in detail below. The ELINT track D-S vectors are updated via Dempster's rule of combination. As data is accumulated, the D-S mass values should converge to a single radar track for a given ELINT track. A threshold test on the D-S mass values is used to determine when a high confidence assignment has been made. Once a high confidence assignment has been made, the provision to maintain a continuous ELINT/radar association under the condition of a stopped target will be provided through the following steps:

1. After a predetermined time (DTE) without a new radar track report, initiate a pseudo track that represents the hypothesis that the target has stopped and the original radar track lost. The position of the pseudo track is computed by predicting the extrapolated radar track state back to the time of its last update, and then applying an exponential slowing model to the current time. The ELINT D-S mass for the original radar track is now split between the original track and the newly formed pseudo track.
2. As new ELINT track data are received, continue extrapolating the original radar track to the time of the ELINT track, and maintain the pseudo track by reapplying the exponential slowing model to the current time until it stops. Perform association/likelihood tests between the ELINT track with these two tracks, as well as other radar tracks that satisfy gates. Use the results of these likelihood calculations to update the D-S association mass vector for the ELINT track. Keep a record of the maximum probability of association between the ELINT track and the pseudo stopped target track. This can be used to validate the hypothesis that the target did actually stop.
3. Once a new radar track (not the original or the pseudo track) is associated with the ELINT track, logic described in detail below can be used to determine the history of the ELINT track and thus output this history to the user.

In some exemplary embodiments, the output may include radar tracks, ELINT tracks, fused track states, and ELINT-to-radar track association information. A special logic is utilized in order to maintain a continuous ELINT/radar association history for the case where the target stopped and the original radar track was lost. This case is recognized by the conditions that, for a given ELINT track, there was a high-probability radar track associated, followed by a high-probability association with a stopped pseudo track, and finally followed by another high-probability association with a different radar track. These three radar tracks could be stitched together to form a continuous association with the ELINT track. In particular, this would allow the user to connect the radar tracks before and after the stop and thus determine the origin and subsequent time history of the ELINT track.

Figure 2:
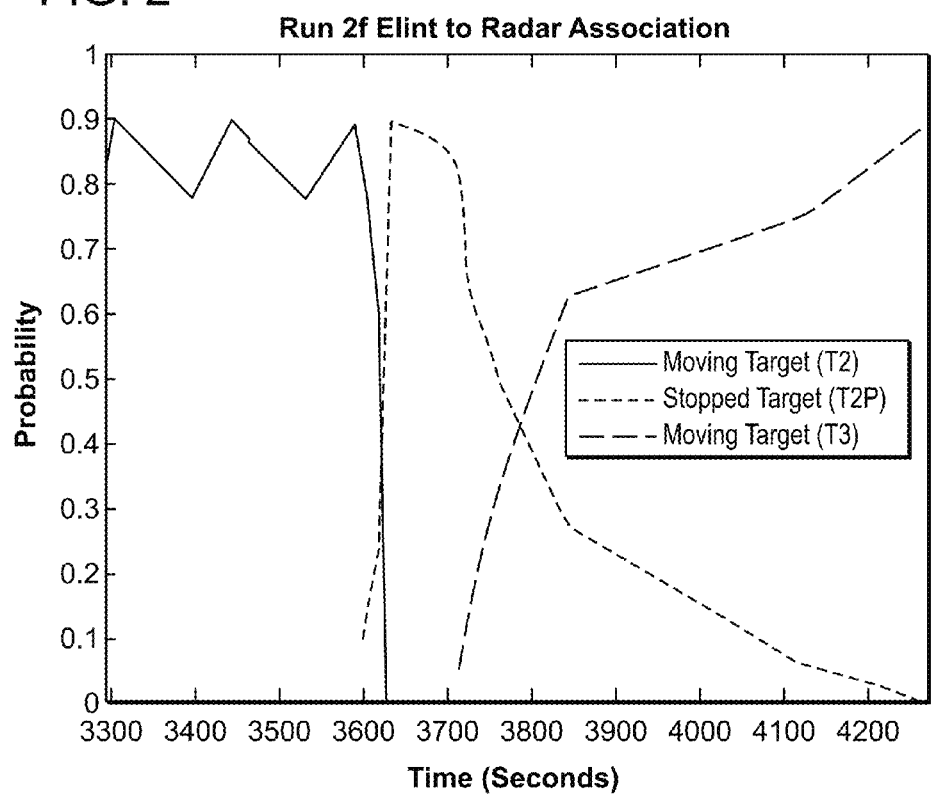
FIG. 2 includes a schematic diagram illustrating the time history of the probability of Elint-track to radar-track association for a stopping target, according to some exemplary embodiments.

The manner in which the approach of the disclosure works can be illustrated by results from a scenario with two boats on parallel courses. FIG. 1 includes a schematic diagram which illustrates the scenario with two boats on parallel courses. Referring to FIG. 1, both boats have two emitters which are tracked continuously. The first boat continues moving throughout the scenario so that a continuous radar track (T1) is maintained on it. The second boat stops for about 150 sec before resuming its course, with the result that two radar tracks (T2, T3) are formed. The tracks are shown in FIG. 1. When there is no update of T2 for some predetermined time (DTE), the logic recognizes a potential stopping target and initiates a pseudo track (T2P). As long as the target remains stationary, the ELINT-to-radar track association probability shifts from T2 to T2P. Finally, when the target starts moving again and track T3 is formed, the probability shifts from T2P to T3. The time history of the probability for one of the emitters on this stopping target is shown in FIG. 2. The probably of Elint-to-radar association on a moving target T2 falls when the radar track is lost. The Elint track then starts to associate with a temporary pseudo radar track under the assumption that the radar cannot detect the target because it has stopped moving. When the target begins moving again and a radar track on T3 is formed, the same Elint-to-radar association increases, indicating that targets T2 and T3 are indeed the same target. A similar history was found for the second emitter on this boat and continuous correct associations were maintained for both emitters on the first boat.

The approach of the disclosure is described in detail herein as using Dempster-Shafer (D-S) reasoning or analysis. It will be noted that the following description describes radar and ELINT tracks; however, the disclosure is applicable to any sort of sensor combination. For example, the disclosure could also be used in pairing angle-only electro-optical/infra-red (EO/IR) tracks with radar tracks, or Automatic Identification System (AIS) with any track type, or with any combination of sensors where it is desirable to maintain track continuity in the event that one of the sensors loses track. As described herein, this is especially useful when pairing radar tracks with another type of sensor track, in order to maintain continuous tracks when the target has slowed or stopped and is no longer detected by the radar.

The approach of the present disclosure is now described in further detail.

Conditions

For the case of the particular exemplary implementation described herein, assume an ELINT track El with mean $\hat{\underline{X}}_{El}$ and covariance matrix $P_{El}$ is input to the global tracker that contains radar tracks $RA_i$ with mean $\hat{\underline{X}}_{RA_i}$ and covariance $P_{RA_i}$, where i is the radar track index. It should be noted that this is an assumption for one particular exemplary implementation. It is noted that, according to the present disclosure, this assumption is not required. In other implementations to which the present disclosure applies, both track types could be input to another function that carries out the association logic of the disclosure, described herein in detail. There may or may not be a radar track that corresponds to the ELINT track. For each ELINT track, the following logic is carried out upon input of new detection data to the global tracker. If an external function is used, the following logic is carried out upon input of new ELINT track data to the function.

Likelihood Tests

To begin, the radar track state estimates may not be valid as of the same time as the ELINT track under consideration. To correct for this time discrepancy, all radar tracks are predicted to the ELINT track state time. Here the position states and the position state covariance will need to be predicted. This is typically done using a discrete-time Markov process. If possible, the model dynamics used in tracking the target should be utilized here. (Note that this may entail predicting the radar track states "backward" to a past time). Define the difference vector of the positional states $$\tilde{\underline{X}}_{EIR_i} = \hat{\underline{X}} - \hat{\underline{X}}_{RA_i}$$

where both track states are in a common coordinate frame. In some exemplary embodiments, an ENU (East North Up) local level frame (LLF) centered at the ELINT sensor position is preferred. The radar track state and covariance will need to be converted to the LLF prior to computing the difference vector. The combined covariance is then $$P_{CEIR_i} = P_{EI} + P_{RA_i}$$

First, apply a coarse gate $$|\tilde{\underline{X}}_{EIR_i}| \leq G \sim 1 \text{ km}$$

Then, for each radar track which passed the coarse gate, compute the likelihood, $$\ell_{EIR_i} = \frac{e^{-d_{ER_i}^2/2}}{(2\pi)^{M/2}\sqrt{|P_{CEIR_i}|}} \triangleq \ell_i \qquad 2$$

Where the normalize distance is computed according to $$d_{ER_i}^2 = \tilde{\underline{X}}_{EIR_i}^T P_{CEIR_i}^{-1} \tilde{\underline{X}}_{EIR_i}$$

And M is the ELINT track state dimension. For bearing only tracks, M would be 1 and for full three dimensional tracks, M would be 3.

Conversion to D-S Masses

Assume there are N tracks that satisfy the gate of Equation 1 and produce likelihoods $l_i$; (i=1, . . . , N). Also, assume a likelihood (track density) for targets that have an ELINT track but no radar track $$l_{NM} = \beta_{NM} = \text{\# targets/Volume} \qquad 3$$

Next, order the likelihoods, including $l_{NM}$, in order of magnitude. Define the re-ordered list of likelihoods as $$l_1, l_2, \ldots, l_{N+1} \qquad 4$$

The likelihoods are converted to D-S masses according to the relationships (defining $T_1$ to have $l_1$, etc.)

$$m(T_1) \frac{\ell_1 - \ell_2}{\ell_1}$$

-continued $$m(T_1 \vee T_2) = \frac{\ell_2 - \ell_3}{\ell_1}$$

$$\vdots$$

$$m(T_1 \vee T_2 \vee \ldots T_{N+1}) = \frac{\ell_{N+1}}{\ell_1}$$

Note that the above relationships were for notational simplicity. In practice, in some exemplary embodiments, the track-to-likelihood relationships are maintained through re-ordering in order to define the appropriate associated track masses.

Also, allow for a mass assignment to uncertainty, also known as the ignorance mass, $m(\theta)$. The mass vector includes the prior mass vector multiplied by $(1-m(\theta))$ and the last element is $m(\theta)$. The sum of these masses will be unity.

Example

Assume a single ELINT sensor track with three dimensional position, and the covariance matrices for the ELINT track and radar tracks, respectively, are:

$$P_{Ei} = \begin{bmatrix} \sigma_1^2 & & \\ & \sigma_2^2 & \\ & & \sigma_3^2 \end{bmatrix} \quad \sigma_1 = \sigma_2 = \sigma_3 = 100 \text{ m}$$

$$P_{R_i} = \begin{bmatrix} \sigma_{1R_i}^2 & & \\ & \sigma_{2R_i}^2 & \\ & & \sigma_{3R_i}^2 \end{bmatrix} \quad \sigma_{1R_i} = \sigma_{2R_i} = \sigma_{3R_i} = 150 \text{ m, for all } i$$

The three radar tracks have computed difference vectors $$\tilde{X}_{ELR_1} = \begin{bmatrix} 100 \\ 100 \\ 100 \end{bmatrix} \quad \tilde{X}_{ELR_2} = \begin{bmatrix} 150 \\ 150 \\ 150 \end{bmatrix} \quad \tilde{X}_{ELR_3} = \begin{bmatrix} 200 \\ 200 \\ 200 \end{bmatrix}$$

The combine covariance would be $$P_C = \begin{bmatrix} 3.25 \times 10^4 & & \\ & 3.25 \times 10^4 & \\ & & 3.25 \times 10^4 \end{bmatrix}$$

$$\sqrt{|P_C|} = \sqrt{3.43} \times 10^6 = 5.8 \times 10^6$$

Then the computed normalize distances for the radar tracks are $$d_{EIR_1}^2 = 0.92, \, d_{EIR_2}^2 = 2.08, \, d_{EIR_3}^2 = 3.69$$

Also, assume the likelihood of no radar tracks for the target as $$\beta_{NM} = \frac{1 \text{ target}}{(1 \text{ km})^3} = 10^{-9}$$

Note that in this case the ELINT track is three dimensional, so M is 3:

$$(2\pi)^{M/2} = 15.7$$

Thus the likelihoods and masses for this example are, $$\ell_1 = \frac{e^{-0.92/2}}{(15.7)(5.8 \times 10^6)} = 6.9 \times 10^{-9}$$

$$\ell_2 = \frac{e^{-2.08/2}}{(15.7)(5.8 \times 10^6)} = 3.9 \times 10^{-9}$$

$$\ell_3 = \frac{e^{-3.69/2}}{(15.7)(5.8 \times 10^6)} = 1.7 \times 10^{-9}$$

$$\ell_4 = 10^{-9}$$

$$m(T_1) = \frac{6.9 - 3.9}{6.9} = 0.435$$

$$m(T_1 \vee T_2) = \frac{3.9 - 1.7}{6.9} = 0.319$$

$$m(T_1 \vee T_2 \vee T_3) = \frac{1.7 - 1}{6.9} = 0.101$$

$$m(T_1 \vee T_2 \vee T_3 \vee T_{NM}) = \frac{1}{6.9} = 0.145$$

Here the notation $T_{NM}$ is used to represent the possibility that there is no corresponding radar track (no match). If this was an existing ELINT track, these masses would then be renormalized to include the uncertainty mass as described above and combined with the track's existing mass vector via Dempster's rule of combination to obtain the tracks current mass vector.

D-S Mass Cumulation

An ELINT track is formed each time a new ELINT track is reported. This ELINT track will have an initial D-S mass vector as computed as described above in detail. Then, each time the track is reported again, the measurement D-S mass vector is computed as described above and the measurement mass vector is combined with the prior track mass vector using Dempster's Rule of combination.

Dempster's Rule of Combination is a method form combining two basic mass assignments $\mathcal{A}(A_i)$ and $m_{\mathcal{B}}(B_j)$, over a given frame of discernment to produce a combined basic mass assignment, $m_C(C) = m(C \mid m_{\mathcal{A}} B)$.

$$m_C(C) = m(C \mid \mathcal{A}, \mathcal{B}) = \frac{1}{1 - \kappa} \sum_{i,j \mid A_i \cap B_j = C} m_{\mathcal{A}}(A_i) m_{\mathcal{B}}(B_j) \quad 5$$

Where k is a measure of inconsistency between the basic mass assignments of $m_A(A_i)$ and $m_B(B_j)$. It is defined as the sum of the mass product for sets from that have null intersections:

$$\kappa = \sum_{i,j \mid A_i \cap B_j = \emptyset} m_{\mathcal{A}}(A_i) m_{\mathcal{B}}(B_j) \quad 6$$

In this application, the frame of discernment is made up of all radar tracks. Upon update, the existing mass vector for an ELINT track will be combined with the newly computed mass vector for that ELINT track to produce the updated mass vector. The updated mass vector is then used to compute the pignistic probabilities.

Once the combined D-S mass vector is computed there may be elements with mass assignment below some threshold, ~0.01. In some exemplary embodiments, these low mass value hypotheses may be removed, with their combined masses assigned to ignorance. A scaling is preformed so that a minimum value of ignorance, m(θ)~0.1, is maintained.

Example

An existing ELINT track has a mass vector, $\mathcal{A}$.

$$m_{\mathcal{A}} = \begin{bmatrix} m_{\mathcal{A}}(T_1) = 0.3 \\ m_{\mathcal{A}}(T_1 \lor T_2) = 0.6 \\ m_{\mathcal{A}}(\theta) = 0.1 \end{bmatrix}$$

Upon update of the ELINT track, a new mass vector, $m_B$, is computed as described above.

$$m_B = \begin{bmatrix} m_B(T_2) = 0.7 \\ m_B(T_2 \lor T_3) = 0.2 \\ m_B(\theta) = 0.1 \end{bmatrix}$$

The previous mass vector and the new mass vector are combined via Dempster's Rule of Combination in order to compute the updated mass vector. The updated mass vector for the ELINT track is computed by first combining the two sets of mass assignments as shown in the table below.

|  | $m_B(T_2) = 0.7$ | $m_B(T_2 \lor T_3) = 0.2$ | $m_B(\theta) = 0.1$ |
|---|---|---|---|
| $m_A(T_1) = 0.3$ | K = 0.21 | K = 0.06 | $m(T_1) = 0.03$ |
| $m_A(T_1 \lor T_2) = 0.6$ | $m(T_2) = 0.42$ | $m(T_2) = 0.12$ | $m(T_1 \lor T_2) = 0.06$ |
| $m_A(\theta) = 0.1$ | $m(T_2) = 0.07$ | $m(T_2 \lor T_3) = 0.02$ | $m(\theta) = 0.01$ |

Sum all of the assignments to the measure of inconsistency:

κ=0.21+0.06=0.27

The new masses result from summing the appropriate entries and dividing by the normalization factor of 1−κ=0.73. Thus, the new values are $m_C(T)$=0.03/0.73

$m_C(T_2)$=(0.42+0.12+0.07)/0.73

$m_C(T_1 \lor T_2)$=0.06/0.73

$m_C(T_2 \lor T_3)$=0.02/0.73

$m_C(\theta)$=0.01/0.73

And the updated mass vector is $$m_C = \begin{bmatrix} m_C(T_1) = 0.0411 \\ m_C(T_2) = 0.836 \\ m_C(T_1 \lor T_2) = 0.082 \\ m_C(T_2 \lor T_3) = 0.027 \\ m_C(\theta) = 0.014 \end{bmatrix}$$

At this point, the ingnorance mass could be artificially boosted to maintain a minimum ignorance and then the remaining masses renormalized. This is example shows how the mass vector for an ELINT track can gain elements over time, which is why it is important to prune masses as their elements become unlikely. It also shows why it is necessary to artificially maintain the ignorance mass and renormalize the masses after each update.

Likelihood for Azimuth Angle Only Associations Derivation

If the ELINT track position is angle-only, then there is an alternate method for the track-to-track association. Angle-only track association is described in detail in this section. Assume sensor position $(x_s, y_s, z_s)$ and ELINT azimuth angle $\hat{\eta}_E$. Also, assume a radar track that has been transformed to ENU LLF coordinates (local to the ELINT sensor position):

$\hat{\underline{X}}_{LLF}^T = [\hat{x}, \hat{y}, \hat{z}, \hat{v}_x, \hat{v}_y, \hat{v}_z]_{LLF}$ Then, the expected angle measurement becomes $\hat{\eta}_R = \tan^{-1}(\delta x/\delta y)$ Where $\delta x = \hat{x}$, $\delta y = \hat{y}$ The angle residual is $\tilde{\eta} = \hat{\eta}_E - \hat{\eta}_R$ This angle residual should be used in the coarse gate to eliminate unlikely radar to ELINT track pairings. An initial value for the angle only coarse gate is 0.04. The likelihood for radar track i becomes $$\ell_{ER_i} = \frac{e^{-\tilde{\eta}_i^2/2\sigma_{\eta_i}^2}}{\sqrt{2\pi}\,\sigma_{\eta_i}} \qquad 1$$

The variance on the azimuth residual is computed from $\sigma_{\eta_i}^2 = H_\eta P_i H_\eta^T + \sigma_{\eta_E}^2$ \qquad 2

Where $\sigma_{\eta_E}^2$=variance on ELINT track azimuth estimate
$P_i$=radar i track covariance matrix And the measurement matrix $H_\eta$ is defined $$H_\eta = \left[\frac{\partial \eta}{\partial x}, \frac{\partial \eta}{\partial y}, 0, 0, 0, 0\right] \qquad 3$$

Where $$\frac{\partial \eta}{\partial x} = \frac{\delta y}{\delta x^2 + \delta y^2}, \quad \frac{\partial \eta}{\partial y} = -\frac{\delta x}{\delta x^2 + \delta y^2}$$

In order to form the likelihood ratio, we need to define the density of ELINT tracks that have no corresponding radar track. Again this will be $$\ell_{NM} = \beta_{NM_\eta} = \frac{\text{targets}}{\text{angle}}$$

And initial guess might be $l_{NM}$=½s deg=1/0.436 rad=2.3

Example

Assume a four degree difference between an angle only ELINT track and a radar track. The angle residual, converted to radians would be $\tilde{\eta} = \hat{\eta}_E - \hat{\eta}_R = 4(0.01745) \approx 0.07$ Given an angle residual variance of $\sigma_{n_i} \sim 5 \text{ deg} = 0.087$ Then the likelihood for the radar track is $$\ell_{ER} = \frac{0.725}{(2.51)(0.087)} = 3.3$$

So that, assuming this is the only associating radar track, the two masses are $m(T_i) = (3.3 - 2.3)/3.3 = 0.30$ $m(T_i \vee T_{NM}) = 0.70$ If this was an existing ELINT track, these masses would then be renormalized to include the uncertainty mass as described above and combined with the track's existing mass vector via Dempster's rule of combination to obtain the tracks current mass vector.

Stopping Target Model

In the event that a target slows or stops, it will no longer be detectable by the radar, however, ELINT tracks will still be maintained on the targets as long as the emission source is still present. In this case, according to exemplary embodiments, additional logic is added to the ELINT/radar track association processing which allows for a potentially stopped target. When this occurs, a stopped target model is created as an alternate hypothesis to the existing radar track. This information can then be presented to the user and can be used to stitch together the previous radar track and the new radar track that may be formed when the target begins moving and is detectable again.

In some exemplary embodiments, the following logic is followed for each radar track during the ELINT-to-radar track association described above. All tracks can be tested, but, for purposes of efficiency, only high-probability associations are considered. The radar track i is tested for potential stopping/slowing behavior by checking the time elapsed since the last track update was received by the global tracker. Given a current (ELINT track) time of t, and the time of the last radar track update, $t_{last}$, compute $\Delta T = t - t_{last}$ If $\Delta T$ exceeds some threshold, which in some exemplary embodiments is chosen to be 10 seconds, assume the target may have slowed or stopped and continue with the stopped target logic below. The state estimate and covariance matrix of the radar track at $t_{last}$, $\hat{X}_{RA_i}$ and $P_{RA_i}$, will be predicted to the current time t using an exponential slowing model. The predicted state and covariance matrix are computed $$\hat{X}_{stop} = \Phi_{stop} * \hat{X}_{RA_i}$$
$$P_{stop} = \Phi_{stop} P_{RA_i} \Phi_{stop}^T + Q_{stop}$$

Where $$\Phi_{stop} = \begin{bmatrix} \phi & 0 & 0 \\ 0 & \phi & 0 \\ 0 & 0 & \phi \end{bmatrix}$$

And $$\phi = \begin{bmatrix} 1 & a_{12} \\ 0 & a_{22} \end{bmatrix}$$

The $a$ terms are defined by $a_{12} = \frac{1 - e^{-\beta * \Delta t}}{\beta}$ $a_{22} = e^{-\beta * \Delta t}$ Note that $\beta$ is the stopping target model time constant, initially defined as 1.0, in some exemplary embodiments. The process noise is defined as $$Q_{stop} = \begin{bmatrix} \sigma_{s1}^2 * Q' & 0 & 0 \\ 0 & \sigma_{s2}^2 * Q' & 0 \\ 0 & 0 & \sigma_{s3}^2 * Q' \end{bmatrix}$$

Where $$Q' = \begin{bmatrix} q_{11} & q_{12} \\ q_{12} & q_{22} \end{bmatrix}$$

And $q_{11} = \frac{4a_{12} - C_{exp} + 2\beta * \Delta T - 3}{\beta^2}$ $q_{12} = \frac{1 - 2a_{22} + C_{exp}}{\beta}$ $q_{22} = 1 - C_{exp}$ $C_{exp} = e^{-2\beta * \Delta T}$ The process noise sigma values are all initially set to 0.05, in some particular exemplary embodiments.

Once the stopped track state prediction is completed, they position and covariance are used in the ELINT-to-radar track association and mass computation described in detail above. Note that the stopped track hypothesis will get its own unique mass separate from the moving radar track which spawned it. Both the stopped track hypothesis and the moving track hypothesis probabilities will then be reported to the user.

Figure 3:
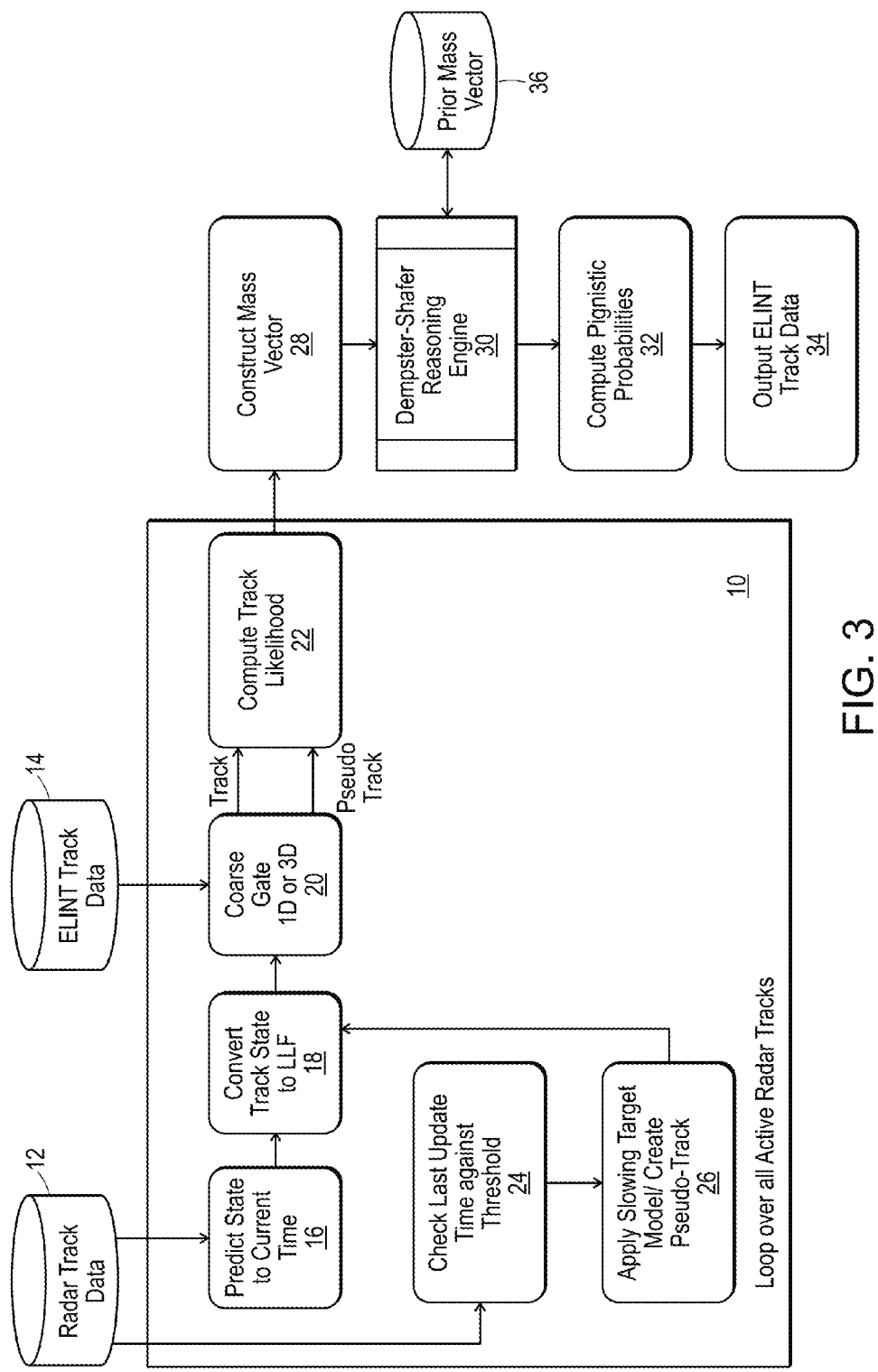
FIG. 3 includes a schematic functional block diagram of a processor of the disclosure, according to some exemplary embodiments.

FIG. 3 includes a schematic functional block diagram of an ELINT post-processor of the disclosure, according to some exemplary embodiments. Referring to FIG. 3, data for radar tracks and ELINT tracks are received from their respective sources and are stored/maintained in respective data stores or cylinders 12 and 14, respectively. These data are received by processing block 10, which includes the elements for processing data for each radar track. In some exemplary embodiments, whenever ELINT data is received, the process is repeated for each ELINT track that has been updated.

The radar track position is kinematically predicted to the ELINT track state time, in element 16. It is noted that this may be a "backwards" prediction. Next, the radar track state is converted to the appropriate coordinate low-level frame (LLF) in element 18. A 1-D or 3-D (as appropriate for the ELINT track data) coarse distance gate is then applied at element 20 to determine if the radar and ELINT tracks could be correlated. If the coarse gate of element 20 is passed, a likelihood for the track-to-track pairing is computed in element 22.

In element 24, the radar track's most recent update time is checked against a threshold to determine if the target may have stopped, i.e., the track stopped receiving updates. If the last track update time exceeds the threshold, then, in element 26, the slowing model is applied to the radar track state in order to determine an estimate of the target position if it had come to a stop. This estimate is used to create a pseudo-track, which is applied to element 18 and subsequently tested with the ELINT track. In element 18, the pseudo-track state estimate is converted to the appropriate LLF. In element 20, a 1-D or 3-D (as appropriate for the ELINT track data) coarse distance gate is applied to determine if the radar pseudo-track and ELINT track could be correlated. If the coarse gate of element 20 is passed, a likelihood for the pseudo-track-to-ELINT-track paring is computed in element 22. It should be noted that both the regular track and the pseudo-track may have a computed likelihood.

Once all of the radar tracks have been processed, the likelihoods, along with a likelihood to account for the case in which no radar tracks would be pared with the ELINT track, are converted to a Dempster-Shafer mass vector in element 28. There will be one mass for each likelihood. An additional mass is added to account for uncertainty, also referred to as the "ignorance mass" herein, and the vector is re-normalized. In the Dempster-Shafer Reasoning Engine, element 30, the mass vector created in element 28 is combined with the prior ELINT track mass vector stored in storage element 36, using Dempster's Rule. After combination, there may be small magnitude mass assignments, which should be pruned based on a predetermined threshold and their masses assigned to ignorance. A scaling may then be done to maintain a minimum ignorance mass. The resulting mass vector is then stored in storage element 36 for the next time the ELINT track is updated. In element 32, the mass vector can then be used to compute pignistic probabilities to represent the possibility that each radar track represented can be paired with the ELINT track. The ELINT track data, along with the pignistic probabilities are then output to the system/user in element 34. Processing in this manner allows for multiple ELINT tracks to be paired with the same radar track.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein: rather, the present disclosure extends to all functionally equivalent structures, methods and uses, such as are within the scope of the appended claims.

The invention claimed is:

1. A method of fusing heterogeneous sensor tracks, comprising:
   receiving electronic intelligence (ELINT) track state estimates related to an object;
   receiving radar output track state estimates;
   extrapolating radar track state estimates to an ELINT track state time;
   determining a first likelihood at a first time of one of the ELINT track state estimates that the one of the radar track state estimates information is also related to the object;
   determining a second likelihood at a second time of the one of the ELINT track state estimates that the one of the radar track state estimates is also related to the object; and
   processing the first likelihood and the second likelihood to determine whether the ELINT track information and the radar track information should be associated as both being related to the object.

2. The method of claim 1, further comprising, if it is determined that the ELINT track information and the radar track information should be associated as both being related to the object, combining the ELINT track information and the radar track information to generate combined ELINT and radar track information related to the object.

3. The method of claim 1, further comprising applying a coarse gate to determine whether the ELINT track information and the radar track information include position information indicating positions within a predetermined threshold maximum distance.

4. The method of claim 1, wherein processing the first and second likelihoods comprises applying Dempster-Shafer analysis to the ELINT track information and the radar track information.

5. The method of claim 1, wherein processing the first and second likelihoods comprises analyzing the radar track information to determine whether a target of the radar track information has stopped moving or has slowed.

6. The method of claim 1, wherein the ELINT track information includes track information related to multiple emitters on the object.

7. An apparatus for fusing heterogeneous sensor tracks, comprising:
   an electronic intelligence (ELINT) interface for receiving ELINT track state estimates related to an object;
   a radar interface for receiving radar output track state estimates information; and
   a processor for: (i) extrapolating radar track state estimates to an ELINT track state time, (ii) determining a first likelihood at a first time of one of the ELINT track state estimates that the one of the radar track state estimates information is also related to the object, (ii) determining a second likelihood at a second time of the one of the ELINT track state estimates that the one of the radar track state estimates is also related to the object, and (iv) processing the first likelihood and the second likelihood to determine whether the ELINT track information and the radar track information should be associated as both being related to the object.

8. The apparatus of claim 7, wherein the processor combines the ELINT track information and the radar track information to generate combined ELINT and radar track information related to the object, if it is determined that the ELINT track information and the radar track information should be associated as both being related to the object.

9. The apparatus of claim 7, wherein the processor applies a coarse gate to determine whether the ELINT track information and the radar track information include position information indicating positions within a predetermined threshold maximum distance.

10. The apparatus of claim 7, wherein the processor applies Dempster-Shafer analysis to the ELINT track information and the radar track information to process the first and second likelihoods.

11. The apparatus of claim 7, wherein the processor analyzes the radar track information to determine whether a target of the radar track information has stopped moving or has slowed, to process the first and second likelihoods.

12. The apparatus of claim 7, wherein the ELINT track information includes track information related to multiple emitters on the object.

* * * * *